G. E. R. ROTHENBUCHER.
PIPE UNION.
APPLICATION FILED FEB. 26, 1914.
1,209,887.
Patented Dec. 26, 1916.
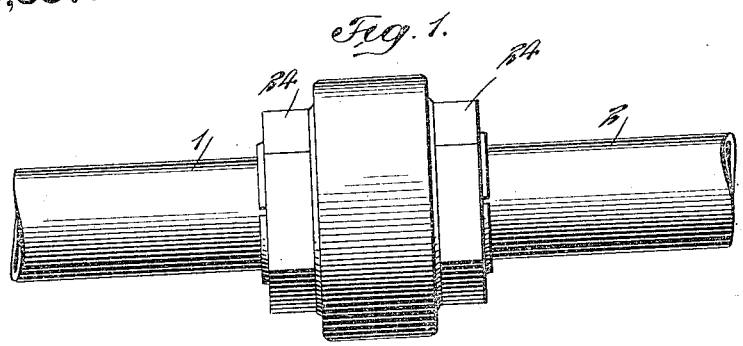
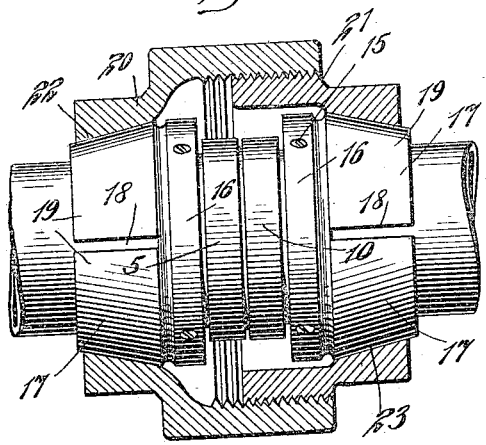
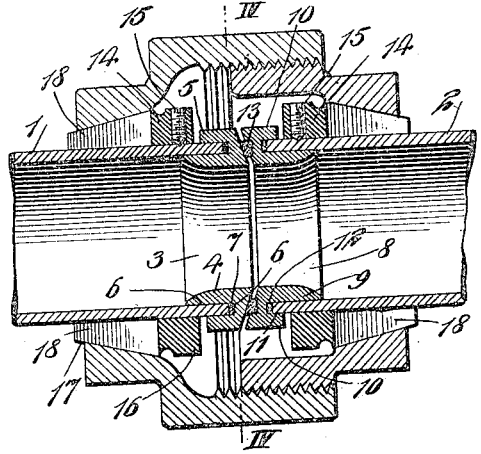
Inventor
George E. R. Rothenbucher
By his Attorney

UNITED STATES PATENT OFFICE.

GEORGE E. R. ROTHENBUCHER, OF NEW YORK, N. Y.

PIPE-UNION.

1,209,887.  Specification of Letters Patent.  Patented Dec. 26, 1916.

Application filed February 26, 1914. Serial No. 821,117.

*To all whom it may concern:*

Be it known that I, GEORGE E. R. ROTHENBUCHER, a citizen of the United States, residing in the borough of Manhattan, city, county, and State of New York, have invented certain new and useful Improvements in Pipe-Unions, of which the following is a specification.

The main object of this invention is to provide a pipe union by means of which the abutting ends of pipes may be rigidly connected together without threading the pipes, the connecting parts being rigidly held to the pipes by means of split clamping sleeves which are compressed around the pipe by means of a two-part connecting coupling.

Another object of the invention is to provide tubular or ring-like caps for the ends of the pipes and to interpose soft metal washers between said caps and between the pipe ends and the cap for the purpose of making tight joints thereby.

In the drawing: Figure 1 is a side elevation of the union applied to connect the ends of two pipes; Fig. 2 a sectional view of the connecting couplings, the interior parts of the union being shown in side elevation; Fig. 3 a complete longitudinal sectional view of the pipes and the union; Fig. 4 a transverse sectional view on the line IV—IV of Fig. 3, and Fig. 5 an end elevation of the union, one of the pipes being shown in transverse sectional view.

Referring to the various parts by numerals 1 and 2 designate the ends of the pipes to be connected by the union.

3 designates a ring-like or tubular cap adapted to be placed over the end of the pipe 1. This cap is formed with the interior flange 4, which is adapted to be arranged within the pipe 1, and with the exterior flange 5 which is adapted to fit around the exterior of the pipe 1, a channel 6 being formed between said two flanges to receive the end of the pipe. Within the channel 6 is placed a soft metal washer 7 against which the end of the pipe rests. The outer end face of this cap is beveled, as shown clearly in Fig. 3, for a purpose which will appear hereinafter. A cap 8, somewhat similar in construction to cap 3, is placed over the end of pipe 2, this cap 8 being formed with the interior flange 9 adapted to fit within the pipe and the exterior flange 10 adapted to fit around the exterior of the pipe, a channel 11 being formed between said flanges. In this channel is arranged a soft metal washer 12 which contacts with the end of the pipe; and the outer end of the cap is beveled to correspond with the bevel on the end of cap 3. The beveled outer surface of cap 8 is recessed to receive a soft metal washer 13, the outer face of which bears against the beveled end of cap 3. It will be readily understood that if the two ends of the pipe be drawn toward each other the washers 7, 12 and 13 will be compressed to form a perfectly tight joint between the pipes. The object of the tubular caps 3 and 8 is to provide means for holding the sealing washer against the ends of the pipes and to provide the broad beveled surfaces between which to impose the soft metal sealing washer 13, so that when the two pipe ends are drawn toward each other the said soft metal washer will be expanded and a perfectly tight joint produced.

On the end of each pipe is secured a clamping conical sleeve 14, said sleeve being lightly or temporarily secured in position by a screw 15 which passes through said sleeve and bears on the pipe. This said screw serves merely to hold the clamping sleeves in position during the preliminary coupling of the pipes, means being provided to cause the sleeves to grasp the pipes and to thereby prevent any slipping of the sleeves during the coupling operation. Each clamping sleeve consists of a ring-like part 16, through which the clamping screws are threaded; and an outwardly tapered clamping part 17 which is slotted at diametrically opposite points as shown at 18, said slots forming clamping sections 19 which are flexible or yieldable and are adapted to be forced inwardly by means of the coupling members, as will be hereinafter described.

Embracing the two clamping sleeves are two coupling members 20 and 21, member 20 being internally threaded and the coupling 21 being externally threaded and arranged to be screwed into coupling member 20. Coupling member 20 is formed with a tapered interior surface 22 which is adapted to engage the conical surface of the clamping sleeve connected to pipe 1, and the coupling member 21 is formed with a similar surface 23 which engages the outer inclined or tapered surfaces of the sections 19 of the clamping sleeve connected to pipe 2.

The coupling members are each provided with hexagonal wrench-engaging portions 24 by means of which they may be rotated to cause them to grip the clamping sleeves and draw the pipes together.

It will be readily understood that with a union of the construction just described the abutting ends of two pipes may be securely locked together without leakage and without threading the ends of the pipes. It is also clear that the union will have no projecting parts; is very neat and compact, and may be readily assembled.

Having thus fully described my invention, what I claim as new, and desire to secure by Letters Patent is:

1. A pipe union comprising two clamping sleeves having slotted outwardly tapered outer ends and solid untapered inner ends, means in the unslotted end of each sleeve for securing said sleeve to the pipe end, a pair of coupling members adapted to bear on the slotted tapered parts of the clamping sleeves and to be threaded into each other to draw the pipe ends toward each other, said coupling members clamping the slotted portions of the sleeves around the pipe ends, and compressible means between the pipe ends to form a liquid-tight joint.

2. A pipe union comprising two clamping sleeves adapted to be secured to pipe ends, two relatively rotatable coupling members adapted to engage each other and the clamping sleeves to draw said sleeves toward each other and clamp them about the pipe ends, a ring-like cap for the end of each pipe to be connected together, each cap being formed with an annular channel to receive the pipe end, and soft metal washers interposed in said channels and between the abutting faces of said caps.

3. A pipe union comprising two conical clamping sleeves having radially slotted outer ends, means for securing one of said clamping sleeves to each of the pipe ends to be connected together, a pair of ring-like caps one for the end of each pipe to be connected together, each cap being formed with a channel to receive a pipe end, said caps having correspondingly beveled outer ends, a soft metal washer interposed between said beveled surfaces of said caps, a pair of coupling members having internal annular beveled surfaces adapted to bear on the tapered parts of the clamping sleeves and to be threaded into each other to draw the clamping sleeves and the pipe ends toward each other and to compress the slotted portions of the clamping sleeves around the pipe ends.

In testimony whereof I hereunto affix my signature in the presence of two witnesses.

GEORGE E. R. ROTHENBUCHER.

Witnesses:
  LILLIAN McGUIRE,
  F. R. MILLER.

Copies of this patent may be obtained for five cents each, by addressing the "Commissioner of Patents, Washington, D. C."